(12) United States Patent
Marmaros et al.

(10) Patent No.: US 8,918,401 B1
(45) Date of Patent: Dec. 23, 2014

(54) SYSTEMS AND METHODS FOR PROVIDING SEARCHABLE PRIOR HISTORY

(75) Inventors: David Marmaros, Mountain View, CA (US); Steve Lawrence, Mountain View, CA (US)

(73) Assignee: Google Inc., Mountain View, CA (US)

( * ) Notice: Subject to any disclaimer, the term of this patent is extended or adjusted under 35 U.S.C. 154(b) by 994 days.

(21) Appl. No.: 12/756,844

(22) Filed: Apr. 8, 2010

Related U.S. Application Data

(63) Continuation of application No. 10/673,681, filed on Sep. 30, 2003, now Pat. No. 7,730,054.

(51) Int. Cl.
*G06F 17/30* (2006.01)

(52) U.S. Cl.
USPC ............ 707/748; 707/758; 707/706; 707/736

(58) Field of Classification Search
CPC .......... G06F 17/30864; G06F 17/3053; G06F 17/30979
USPC ................ 707/758, 748, 706, 736, 609, 723; 715/234, 700; 709/203
See application file for complete search history.

(56) References Cited

U.S. PATENT DOCUMENTS

| | | | |
|---|---|---|---|
| 5,946,680 A * | 8/1999 | Shorter et al. ................. | 1/1 |
| 6,195,654 B1 * | 2/2001 | Wachtel ....................... | 1/1 |
| 6,285,999 B1 | 9/2001 | Page | |
| 6,374,241 B1 | 4/2002 | Lamburt et al. | |
| 6,460,060 B1 * | 10/2002 | Maddalozzo et al. ........ | 715/234 |
| 6,480,853 B1 * | 11/2002 | Jain .............................. | 1/1 |
| 6,489,968 B1 | 12/2002 | Ortega et al. | |
| 6,539,377 B1 | 3/2003 | Culliss | |
| 6,601,061 B1 | 7/2003 | Holt et al. | |
| 6,606,061 B2 * | 8/2003 | Wong et al. ............ | 343/700 MS |
| 6,718,324 B2 | 4/2004 | Edlund et al. | |
| 6,968,332 B1 | 11/2005 | Milic-Frayling et al. | |
| 7,181,444 B2 | 2/2007 | Porter et al. | |
| 7,206,778 B2 | 4/2007 | Bode et al. | |
| 7,831,548 B1 * | 11/2010 | Round et al. ................. | 707/609 |
| 2002/0152199 A1 | 10/2002 | Teng et al. | |
| 2002/0156832 A1 * | 10/2002 | Duri et al. .................... | 709/203 |
| 2002/0198882 A1 * | 12/2002 | Linden et al. ................. | 707/10 |
| 2003/0055870 A1 * | 3/2003 | Smethers ....................... | 709/203 |
| 2003/0080986 A1 * | 5/2003 | Baird ............................ | 345/700 |
| 2003/0220895 A1 * | 11/2003 | Vailaya ......................... | 707/1 |
| 2004/0030688 A1 * | 2/2004 | Aridor et al. .................. | 707/3 |
| 2004/0034629 A1 | 2/2004 | Genser | |
| 2004/0111678 A1 | 6/2004 | Hara et al. | |
| 2004/0133440 A1 | 7/2004 | Carolan et al. | |

(Continued)

OTHER PUBLICATIONS

Co-Pending U.S. Appl. No. 10/673,681, filed Sep. 30, 2003 entitled "Systems and Methods for Providing Searchable Prior History" by David Marmaros et al., 52 pages.

(Continued)

*Primary Examiner* — Rehana Perveen
*Assistant Examiner* — Tiffany Thuy Bui
(74) *Attorney, Agent, or Firm* — Harrity & Harrity, LLP

(57) ABSTRACT

A system may obtain search results associated with a search performed using a search query. The system may modify the search results, if necessary, based at least in part on information associated with prior document accesses by a user and present the modified search results to the user. The modification of the search results might including adding, deleting, and/or reordering items in the search results. One or more advertisements relevant to the search query may also be presented to the user along with the modified search results.

24 Claims, 10 Drawing Sheets

(56) References Cited

U.S. PATENT DOCUMENTS

2004/0249790 A1 12/2004 Komamura
2005/0027699 A1* 2/2005 Awadallah et al. ............... 707/3
2005/0065916 A1 3/2005 Ge et al.

OTHER PUBLICATIONS

Microsoft Corporation (NPL: "Find and Return to Web Page You've Recently Visited", Posted Mar. 26, 2003, Internet Explorer, Microsoft Corporation).

Internet Explorer; "Find and Return to Web Pages You've Recently Visited"; Microsoft, Mar. 26, 2003; pp. 1-4.

Earthlink; "How to Use Internet Explorer's History List"; Earthlink, 2003; Jul. 28, 2003 (print date); pp. 1-4.

Phillips Ponder Company; "Welcome to Internet Explorer History Viewer"; Jul. 28, 2003 (print date); 3 pages.

About Inc.; "History Button: Internet Explorer Toolbar Buttons Explained"; About Inc., 2003; Jul. 28, 2003 (print date); pp. 1-4.

* cited by examiner

US 8,918,401 B1

SYSTEMS AND METHODS FOR PROVIDING SEARCHABLE PRIOR HISTORY

RELATED APPLICATIONS

This application is a continuation of U.S. patent application Ser. No. 10/673,681, now U.S. Pat. No. 7,730,054, filed Sep. 30, 2003, which is incorporated herein by reference.

BACKGROUND OF THE INVENTION

1. Field of the Invention

The present invention relates generally to information retrieval systems and, more particularly, to systems and methods for providing searchable prior history.

2. Description of Related Art

Networks, such as the Internet, have become great sources of information and services. Users view many different Internet documents, but no mechanism exists for easily finding this content again. Current search engines do not tailor results to the individual user. Some search engines have tried, but they rely on storing client information on the server and tailoring the results from there. This creates privacy concerns because the user's actions are stored remotely and sent over the Internet. It also adds latency to the search process.

Users may also create bookmarks to flag previously-viewed documents. Creating a bookmark, however, requires that the user perform some action at the time when the document is viewed. As a result, the bookmarks are useless when a user desires content that the user did not previously bookmark.

Current web browsers, such as Microsoft's Internet Explorer, record some search history of the user. The web browser may even permit the user to search for terms in pages previously viewed by the user. The web browser does not, however, provide the search results in any meaningful way to the user. For example, the web browser typically returns the search results in an alphabetic order.

Therefore, there exists a need for a passive mechanism to monitor a user's activity and search a history of the activity in a meaningful way.

SUMMARY OF THE INVENTION

Systems and methods, consistent with the present invention, address this and other needs by providing a passive mechanism that monitors a user's activity and creates an index therefrom. For example, the mechanism may index the documents viewed by the user and store the index in a database that permits later searching and retrieval in a manner that is meaningful to the user.

In accordance with one aspect consistent with the principles of the invention, a method may include receiving a search query, receiving first search results based at least in part on a search performed using the search query, and performing a search of a history database using the search query to obtain second search results. The history database may store information regarding prior document accesses. The method may also include modifying the first search results based at least in part on the second search results and outputting the modified first search results.

In accordance with another aspect, a system may include a history database and a browser assistant. The history database may store information regarding prior document accesses. The browser assistant may obtain search results and determine whether one or more of the search results correspond to information stored in the history database. The browser assistant may also reorder the search results when the one or more search results correspond to information stored in the history database to form reordered search results and present the reordered search results.

In accordance with a further aspect, a method for searching a history database is provided. The method may include storing information regarding prior document accesses in a history database, receiving a search query, and searching the history database based at least in part on the search query to obtain search results. The method may also include ranking the search results using at least one of a plurality of parameters and outputting the ranked search results.

In accordance with another aspect, a method may include receiving a search query and searching a history database based at least in part on the search query to obtain search results. The history database may store information regarding previous document accesses. The method may also include obtaining one or more advertisements relating to the search query and presenting the search results and the one or more advertisements.

In accordance with yet another aspect, a method for providing search results is provided. The method may include receiving a search query, receiving first search results based at least in part on a search performed using the search query, and performing a search of a history database using the search query to obtain second search results. The history database may store information regarding prior document accesses. The method may also include presenting the first search results and the second search results.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Implementations consistent with the principles of the invention record information corresponding to document accesses by a user. These implementations permit explicit and implicit searching of this information and present the information to a user in a manner that is meaningful to the user.

Exemplary Network Configuration

Figure 1:
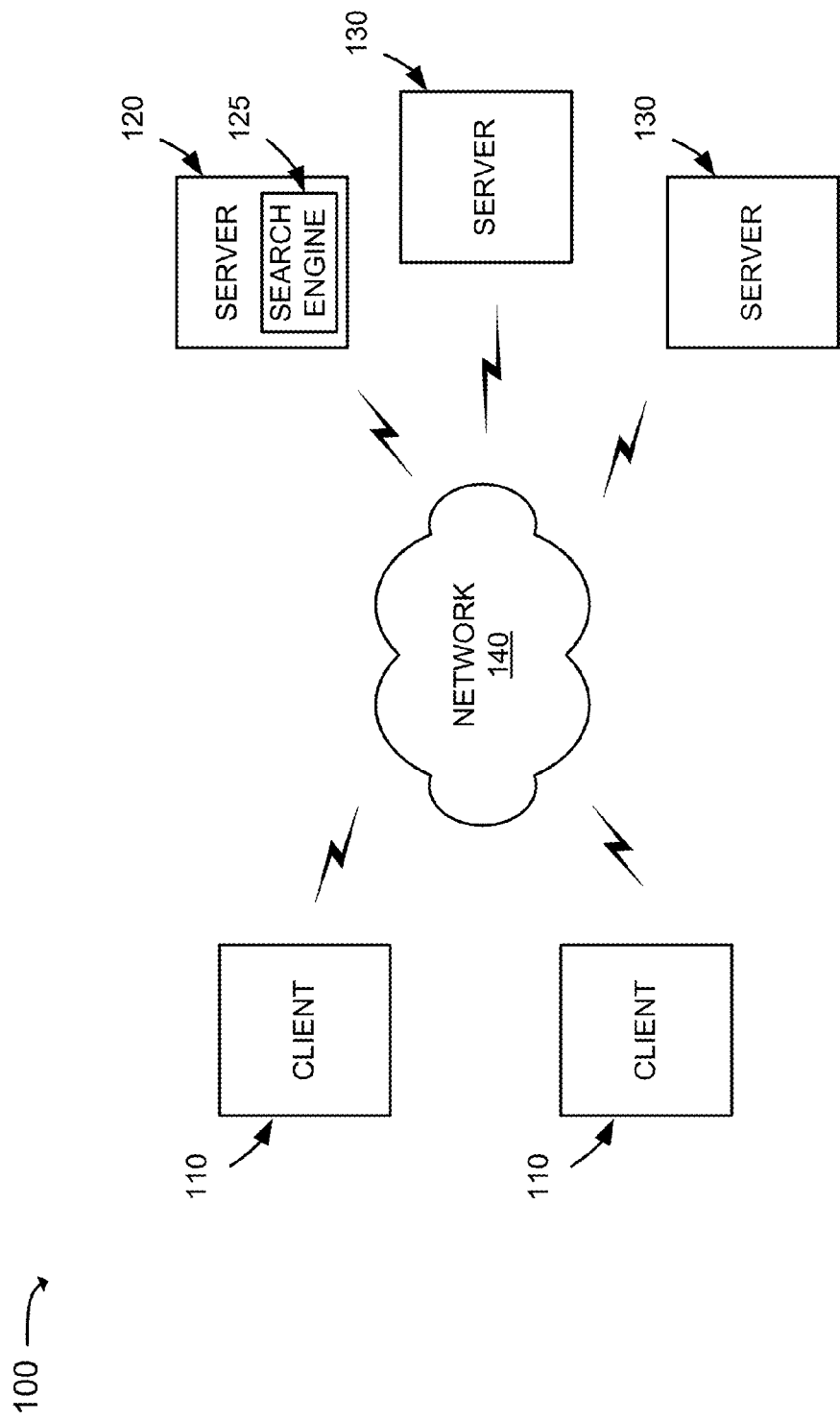
FIG. 1 is a diagram of an exemplary network in which systems and methods consistent with the present invention may be implemented.

FIG. 1 is an exemplary diagram of a network 100 in which systems and methods consistent with the principles of the invention may be implemented. Network 100 may include multiple clients 110 connected to multiple servers 120 and 130 via a network 140. Network 140 may include a local area network (LAN), a wide area network (WAN), a telephone network, such as the Public Switched Telephone Network (PSTN), an intranet, the Internet, a memory device, another type of network, or a combination of networks. Two clients 110 and three servers 120 and 130 have been illustrated as connected to network 140 for simplicity. In practice, there may be more or less clients and servers. Also, in some instances, a client may perform the functions of a server and a server may perform the functions of a client. In this case, the client and the server may physically reside on the same device.

Clients 110 may include client entities. An entity may be defined as a device, such as a wireless telephone, a personal computer, a personal digital assistant (PDA), a lap top, or another type of computation or communication device, a thread or process running on one of these devices, and/or an object executable by one of these device. Servers 120-130 may include server entities that process, search, and/or maintain documents in a manner consistent with the principles of the invention. Clients 110 and servers 120-130 may connect to network 140 via wired, wireless, or optical connections.

In an implementation consistent with the principles of the invention, server 120 may include a search engine 125 usable by clients 110. Servers 130 may store or maintain documents accessible by clients 110.

Exemplary Client Architecture

Figure 2:
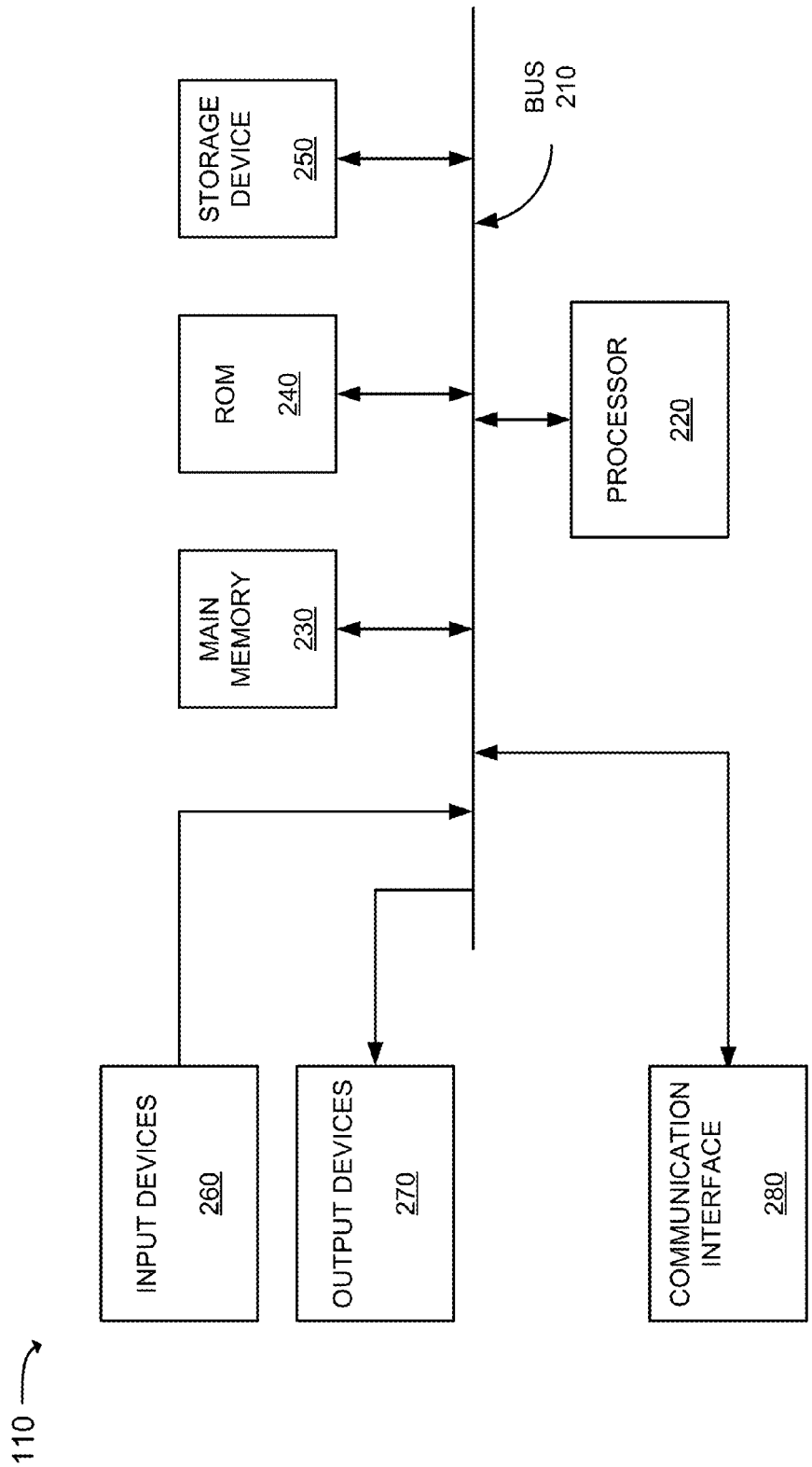
FIG. 2 is an exemplary diagram of a client of FIG. 1 in an implementation consistent with the present invention.

FIG. 2 is an exemplary diagram of a client 110 according to an implementation consistent with the principles of the invention. Client 110 may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of client 110.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device(s) 260 may include one or more conventional mechanisms that permit a user to input information to client 110, such as a keyboard, a mouse, a pen, voice recognition and/or biometric mechanisms, etc. Output device(s) 270 may include one or more conventional mechanisms that output information to the user, including a display, a printer, a speaker, etc. Communication interface 280 may include any transceiver-like mechanism that enables client 110 to communicate with other devices and/or systems. For example, communication interface 280 may include mechanisms for communicating with another device or system via a network, such as network 140.

As will be described in detail below, clients 110, consistent with the principles of the invention, perform certain searching-related operations. Clients 110 may perform these operations in response to processor 220 executing software instructions contained in a computer-readable medium, such as memory 230. A computer-readable medium may be defined as one or more physical or logical memory devices and/or carrier waves.

The software instructions may be read into memory 230 from another computer-readable medium, such as data storage device 250, or from another device via communication interface 280. The software instructions contained in memory 230 causes processor 220 to perform processes that will be described later. Alternatively, hardwired circuitry may be used in place of or in combination with software instructions to implement processes consistent with the present invention. Thus, implementations consistent with the principles of the invention are not limited to any specific combination of hardware circuitry and software.

Exemplary Computer-Readable Medium

Figure 3:
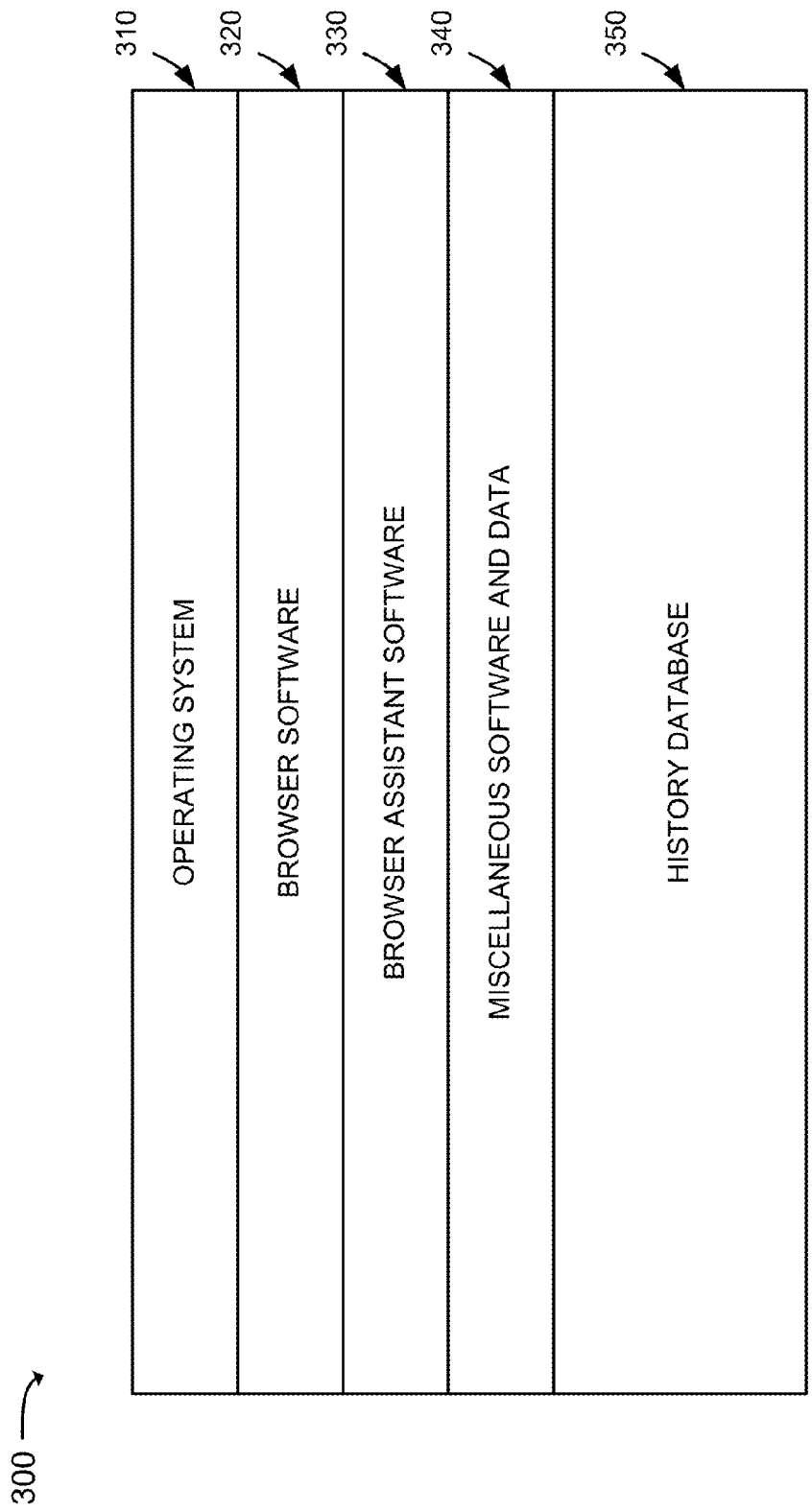
FIG. 3 is a diagram of an exemplary computer-readable medium that may be used by a client of FIG. 1 according to an implementation consistent with the present invention.

FIG. 3 is a diagram of an exemplary computer-readable medium 300 that may be used by a client 110 according to an implementation consistent with the principles of the invention. The contents of computer-readable medium 300 may physically reside in one or more memory devices accessible by, but not necessarily part of, client 110. Computer-readable medium 300 may include an operating system 310, browser software 320, browser assistant software 330, miscellaneous other software and data 340, and history database 350.

Operating system 310 may include conventional operating system software, such as the Windows, Unix, Mac OS X, or Linux operating systems. Browser software 320 may include conventional browser software, such as Internet Explorer, Navigator, Opera, Mozilla, or Windows Explorer browsers, or other mechanisms used to view content, such as Windows Compact Edition (WinCE), tablet personal computers, phones, or other wireless devices with Wireless Application Protocol (WAP) browsers.

Browser assistant software 330 may include executable code, such as a plug-in, an applet, a dynamic link library (DLL), or a similar type of executable object or process. Client 110 may obtain the executable code from server 120 or from a third party server, disk, tape, network, CD-ROM, etc. Alternatively, the executable code may be pre-installed on client 110.

In another implementation consistent with the present invention, browser assistant 330 is part of browser 320. In this implementation, browser 320 performs one or more of the functions of browser assistant 330, as described below. In yet another implementation, browser assistant 330 is a process separate from and runs concurrently with browser 320. In this implementation, browser assistant 330 may interface between browser 320 and network 140.

Browser assistant 330 may be automatically activated upon initiation of client 110 or browser 320. Alternatively, browser assistant 330 may be activated when instructed by a user. Some of the functions performed by browser assistant 330 may be transparent to the user. For example, browser assistant 330 may populate history database 350 based on user activity (e.g., document accesses) and perform implicit searches of history database 350.

Other functions performed by browser assistant 330 may occur in response to user instruction. For example, the user may instruct browser assistant 330 to perform an explicit search of history database 350. To permit the user to initiate some of these functions, browser assistant 330 may take the form of a graphical user interface, such as a toolbar, software button, or menu, that provides an extension to browser 320.

Figure 4:
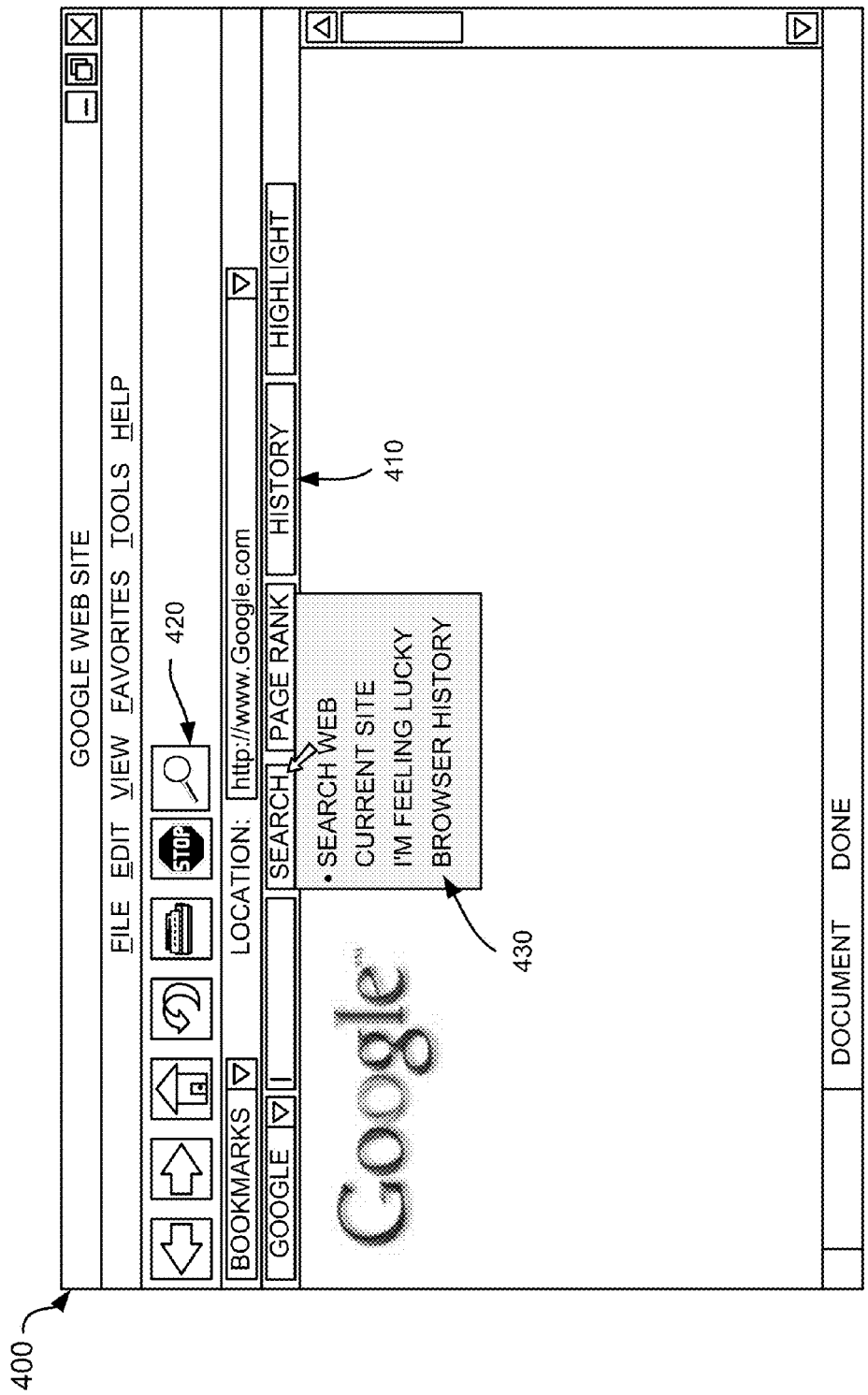
FIG. 4 is an exemplary diagram of a graphical user interface that includes an interface for a browser assistant that facilitates the searching of documents previously viewed by a user according to an implementation consistent with the principles of the invention.

FIG. 4 is an exemplary diagram of a graphical user interface 400 that includes an interface for browser assistant 330 that facilitates the searching of documents previously viewed by a user according to an implementation consistent with the principles of the invention. Graphical user interface 400 illustrated in FIG. 4 shows three possible ways to activate browser assistant 330: a toolbar button 410, a browser button 420, and a menu item 430. In other implementations, browser assistant 330 may take other forms.

Toolbar button 410 and browser button 420 may include software buttons selectable by a user to initiate functions of browser assistant 330. In this case, a user may activate a function of browser assistant 330 by selecting toolbar button 410 or browser button 420. Menu item 430 may be selectable by a user to initiate functionality of browser assistant 330. In this case, a user may activate a function of browser assistant 330 by selecting the menu item using, for example, a mouse.

As described in more detail below, browser assistant 330 may perform many searching-related functions to enhance a user's search experience. Browser assistant 330 may attach to browser 320 to provide additional functionality to the user.

Returning to FIG. 3, miscellaneous software and data 340 may include programs and data used by client 110 to perform searching-related and non-searching-related operations.

History database 350 may be implemented as one or more databases resident in one or more memory devices. History database 350 may store information regarding documents accessed by the user. The documents may include local documents and non-local documents. Local documents might include local files of different types and formats, such as e-mails, images (e.g., photographs or pictures) in various formats, application files (e.g., PDF, Word, Excel, PowerPoint, WordPerfect, etc.) in various formats, video files, audio files, etc. Non-local documents might include files of different types and formats from a non-local source, such as web documents in various formats (e.g., Hypertext Markup Language (HTML) or Extensible Markup Language (XML)) or network documents of another kind.

The information in history database 350 may be indexed in a conventional manner to facilitate its later retrieval. History database 350 may store various information regarding a document, such as the text of the document, the size of the document, and HTML and supporting images from the document.

History database 350 may also, or alternatively, store information regarding the number of times that the user has accessed the document, the date(s) and/or time(s) when the document was accessed, the amount of time that the user spent on the document, and/or whether the user printed, bookmarked, or saved the document. It may be possible to add (with some weight) the amount of time that the user spent accessing a link from the document to the amount of time that the user spent accessing the document. History database 350 may also, or alternatively, store a rating of the document by the user. The user may rate a document using any technique available to the user. For example, the user may use voting buttons, such as the ones offered by Google Inc. on the Google toolbar, to rate the document either positively or negatively. History database 350 may also, or alternatively, store information from a server, such as server 120. For example, server 120 may provide a rating, category, or other information associated with the document.

History database 350 may record information regarding all documents accessed by the user. Alternatively, history database 350 may set one or more thresholds regarding, for example, the number of times a document is accessed or the amount of time spent on a document. History database 350 may then compare information regarding a user's access of a document to these one or more thresholds to determine whether to store information regarding the document. For example, history database 350 may specify that a document be accessed at least two times or for more than 15 seconds before storing information regarding the document.

History database 350 may be capable of searching information regarding documents accessed by the user. For example, history database 350 may receive a search query from browser assistant 330, search for information relevant to the search query, and return results to browser assistant 330.

History database 350 may set one or more thresholds that control whether a document can be included in results of a search query. For example, history database 350 may set one or more thresholds regarding the number of times a document is accessed or the amount of time spent on a document. History database 350 may then compare information regarding a user's access of a document to these one or more thresholds to determine whether to permit the document to be included in the search results. For example, history database 350 may specify that a document be accessed at least two times or for more than 30 seconds before permitting the document to be included in the results.

Exemplary Server Architecture

Figure 5:
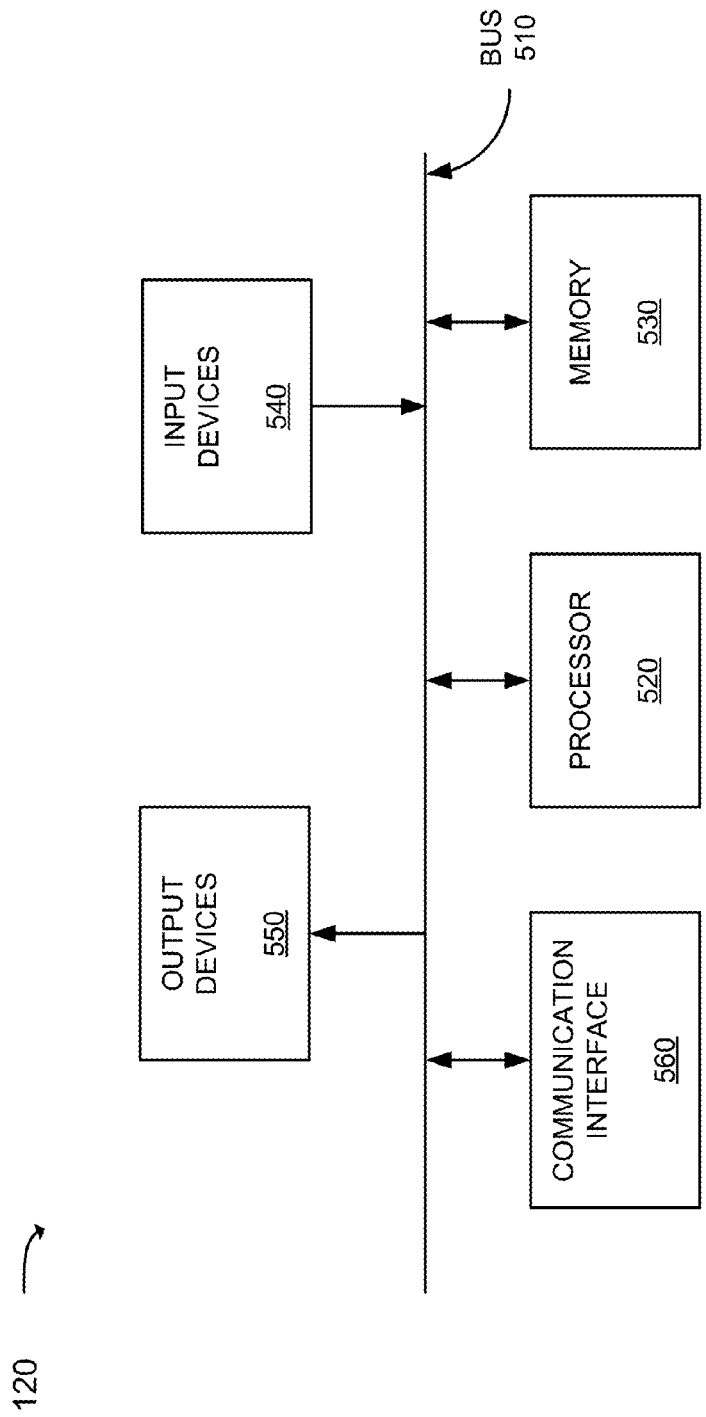
FIG. 5 is an exemplary diagram of a server of FIG. 1 according to an implementation consistent with the present invention.

FIG. 5 is an exemplary diagram of server 120 according to an implementation consistent with the principles of the invention. Servers 130 may be similarly configured.

Server 120 may include a bus 510, a processor 520, a memory 530, one or more input devices 540, one or more output devices 550, and a communication interface 560. Bus 510 permits communication among the components of server 120. Processor 520 may include any type of conventional processor or microprocessor that interprets and executes instructions. Memory 530 may include a RAM or another type of dynamic storage device that stores information and instructions for execution by processor 520; a ROM or another type of static storage device that stores static information and instructions for use by processor 520; and/or some other type of magnetic or optical recording medium and its corresponding drive.

Input device(s) 540 may include one or more conventional mechanisms that permit an operator to input information into server 120, such as a keyboard, mouse, pen, etc. Output device(s) 550 may include one or more conventional mechanisms that output information to the operator, such as a display, a printer, a speaker, etc. Communication interface 560 may include any transceiver-like mechanism that enables server 120 to communicate with other devices and systems via a network, such as network 140.

As will be described in detail below, server 120, consistent with the principles of the invention, performs certain searching-related operations. Server 120 may perform these operations in response to processor 520 executing software instructions contained in a computer-readable medium, such as memory 530. The software instructions may be read into memory 530 from another computer-readable medium or from another device via communication interface 560. The software instructions contained in memory 530 causes processor 520 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Processing for Storing Information in History Database

Figure 6:
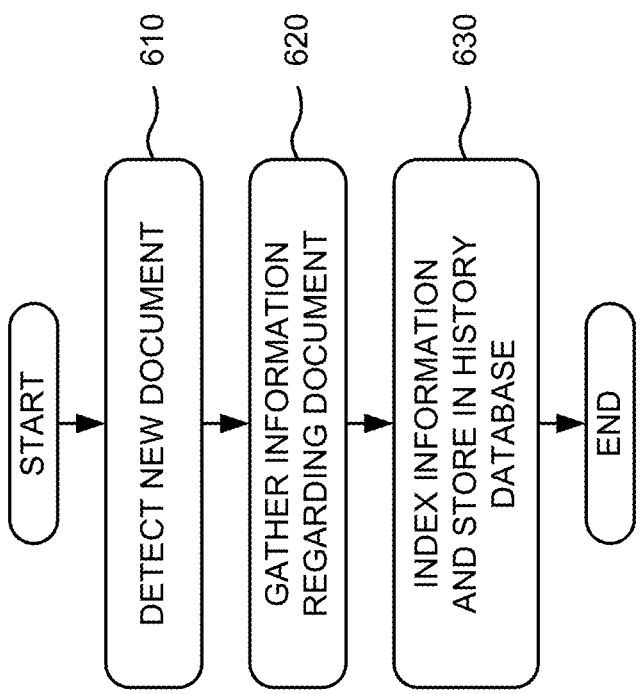
FIG. 6 is a flowchart of exemplary processing for storing information into the history database of FIG. 3 in accordance with an implementation consistent with the principles of the invention.

As described above, history database 350 may store information regarding documents accessed by a user. FIG. 6 is a flowchart of exemplary processing for storing information into history database 350 in accordance with an implementation consistent with the principles of the invention. Processing may begin with a user accessing one or more documents using client 110. For example, the user may access a document (e.g., a web page) over network 140 using browser 320. The user may also access a document stored locally by client 110, such as a word processing document or another type of document.

Browser assistant 330 may detect that the user has accessed a new document (act 610). For example, browser assistant 330 may monitor user activity to determine when the user accesses a new document. Browser assistant 330 may then gather information regarding the new document (act 620). For example, browser assistant 330 may gather information relating to the text of the document, the size of the document, HTML and supporting images from the document, the title of the document, modification time(s) associated with the document, the number of times that the user has accessed the document, the date(s) and/or time(s) when the document was accessed, the amount of time that the user spent on the document, a category of the document, a rating of the document, and/or other attributes associated with the document.

Browser assistant 330 may communicate with history database 350 for storage of the information. For example, browser assistant 330 may call history database 350 and provide it with the information that was gathered regarding the document. History database 350 may then index the information to facilitate its later retrieval and store the information (act 630).

If one or more thresholds have been specified regarding the storage of information in history database 350, history database 350 may determine whether the information satisfies these one or more thresholds prior to storing the information. For example, a threshold may be specified that indicates that the user has to access a document for more than 15 seconds before the information regarding the document will be stored in history database 350.

In another implementation, browser assistant 330, instead of history database 350, may determine whether the user access satisfies the threshold. Browser assistant 330 may discard the information (or not gather the information) when the document access fails to satisfy the threshold.

Whether information is stored by history database 350 may be user-configurable. For example, a user may be permitted to select which documents are indexed by history database 350. The user may decide to not include or remove advertisements, e-mail, boilerplate material (e.g., navigational text, copyright statements, etc.), hidden text, pornography, and other undesirable information from documents before indexing them. The user might also decide to not include or remove certain documents, such as documents from specific locations (e.g., web sites) from the index. The user might further be permitted to index or re-weight different parts of a document. The user may also be permitted to manage the index by, for example, deleting from it or limiting its size. The user may further be permitted to share the index between computers using, for example, a peer-to-peer (P2P) process, a client-server process that uses a file transfer protocol (FTP), a graphical user interface (GUI) application interoperability architecture (GAIA), or another type of process for transferring information.

Mechanisms may also exist for flushing history database 350. For example, parameters may be specified for determining which documents to remove from history database 350. One parameter might specify that documents that have not been accessed more than a predetermined number of times (e.g., has only been accessed once) be flushed from history database 350. A further parameter might specify that documents that have not been accessed in a predetermined time period (e.g., has not been accessed in the last 6 months) be flushed from history database 350. Another parameter might specify that documents that have not been accessed for more than a predetermined amount of time (e.g., has not been accessed for more than 30 seconds at a time) be flushed from history database 350. Yet another parameter might specify that documents that include a predetermined word or certain web site parameters be flushed from history database 350. For example, a parameter might specify that all documents containing the word "buffy" or all documents from the site "google.com" should be deleted. A further parameter might specify that documents matching a predefined filter (e.g., a pornography filter) should be flushed from history database 350. Yet other parameters might include combinations of these parameters, or other parameters, that facilitate the determination of which documents to flush from history database 350.

Exemplary Processing for Explicit History Search

Figure 7:
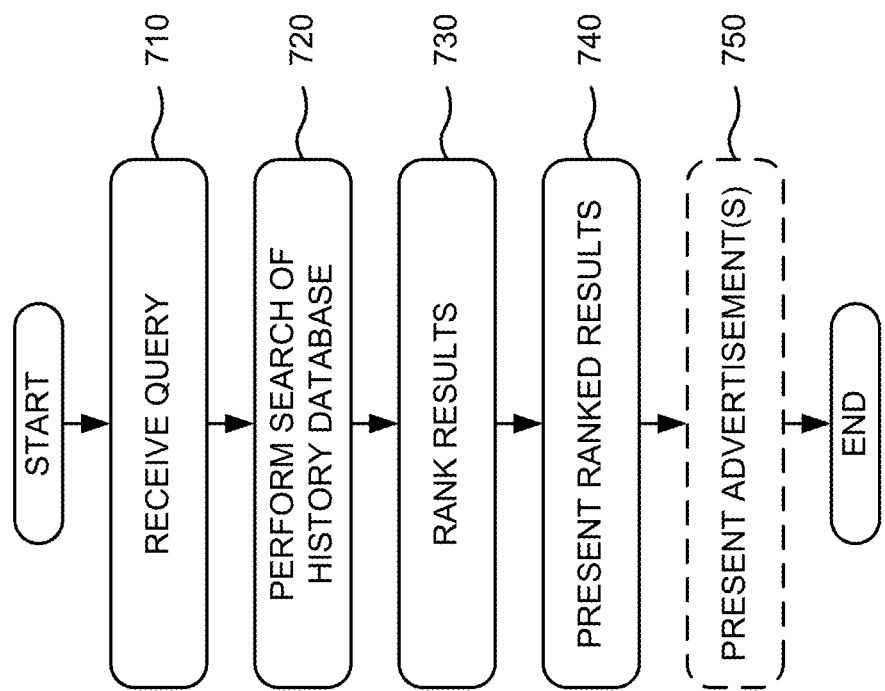
FIG. 7 is a flowchart of exemplary processing for performing an explicit history search according to an implementation consistent with the principles of the invention.

FIG. 7 is a flowchart of exemplary processing for performing an explicit history search according to an implementation consistent with the principles of the invention. Processing may begin with the user providing a search query to browser assistant 330. In one implementation, the user may provide the search term(s) via a toolbar, such as toolbar 400 illustrated in FIG. 4. The form of the query may be flexible. For example, the user may be permitted to provide parameters that are not typically accepted by standard search engines. One parameter might include a date, time, date range, and/or time range in which a document was last accessed by the user. For example, the user may specify that the user desires documents that the user last accessed between date_1 and date_2. Another parameter might include a frequency at which a document was accessed by the user. For example, the user may specify that the user desires documents that the user has accessed two or more times. Yet another parameter might include a duration of time spent accessing a document. For example, the user may specify that the user desires documents that the user spent at least one minute accessing. Combinations of these parameters, or other parameters, may also be possible.

The user may then instruct browser assistant 330 to perform an explicit history search based on the search term(s). The user may do so by selecting, for example, a toolbar button, a browser button, or a menu item, such as the ones illustrated in FIG. 4. Browser assistant 330 may then receive the search query and send it to history database 350 (act 710). History database 350 may use the query to perform a search for information (e.g., local and non-local documents) that match the query (act 720). History database 350 may use conventional database searching techniques to find matching documents as results from the search. History database 350 may then return the results to browser assistant 330.

In the case where history database 350 is implemented as multiple databases, browser assistant 330 may query each of them based on the search query. Browser assistant 330 may then merge their results.

In the case where history database 350 sets one or more thresholds for controlling which documents to include in the results, history database 350 may compare information regarding a document to these one or more thresholds to determine whether to permit the document to be included in the search results.

Browser assistant 330 (or history database 350) may rank the results in some manner (act 730). The results may be ranked in a number of different ways and the particular way may be user-configurable. For example, the results may be ranked by date (e.g., first access, last access, etc.), relevancy (e.g., word matching, traditional search engine "ranking" algorithms, etc.), how much they are thought to be liked by the user (e.g., user rating, time spent accessing, etc.), or some combination of these. Browser assistant 330 may obtain the assistance of a server, such as server 120, to aid in the ranking of the results.

When ranked by date, the results may be sorted at least in part based on when the documents were first or last accessed by the user. In other implementations, other dates relating to access of documents by the user may be used.

When ranked by relevancy, the results may be sorted based at least in part on how well the documents match the search term(s) provided by the user. In another implementation, the results may be sorted based at least in part on the PageRank™ associated with the documents. PageRank™ is a ranking technique used by Google Inc. and described in U.S. Pat. No. 6,285,999. In yet another implementation, the results may be sorted by a server, such as server 120. In this case, the results may be transmitted to the server with a request to sort the documents. The server may sort the documents as if they were the result of a network search and return the sorted results for presentation to the user.

When ranked by how much they are thought to be liked by the user, the results may be sorted based on one or more factors that tend to indicate that the user likes certain documents more than other documents. For example, the rating of a document by the user (using, for example, voting buttons) may indicate whether the user likes the document. The frequency at which the user accesses a document may also indicate whether the user likes the document. It may be assumed that the user may tend to frequently visit documents that the user likes. The amount of time that the user spends accessing a document may further indicate whether the user likes the document. It may be assumed that the user may spend a lot of time accessing a document that the user likes. Combinations of these factors, or other factors, may be used to indicate whether a user likes a document.

It may be desirable to remove one or more documents from the results before presenting them to the user. For example, documents that are judged to not be relevant enough to the search term(s) provided by the user or the context of the search term(s), documents that the user has shown not to like (e.g., ones that the user has rated negatively), or the other documents may be removed from the results.

Browser assistant 330 may present the ranked results to the user (act 740). Optionally, browser assistant 330 may gather one or more advertisements to present to the user along with the results. For example, browser assistant 330 may notify a server, such as server 120, to obtain the advertisement(s). Browser assistant 330 may send the search term(s) entered by the user to the server and receive from the server one or more advertisements that are relevant to the search term(s). Browser assistant 330 may then present the advertisement(s) to the user along with the ranked results (act 750).

Figure 8:
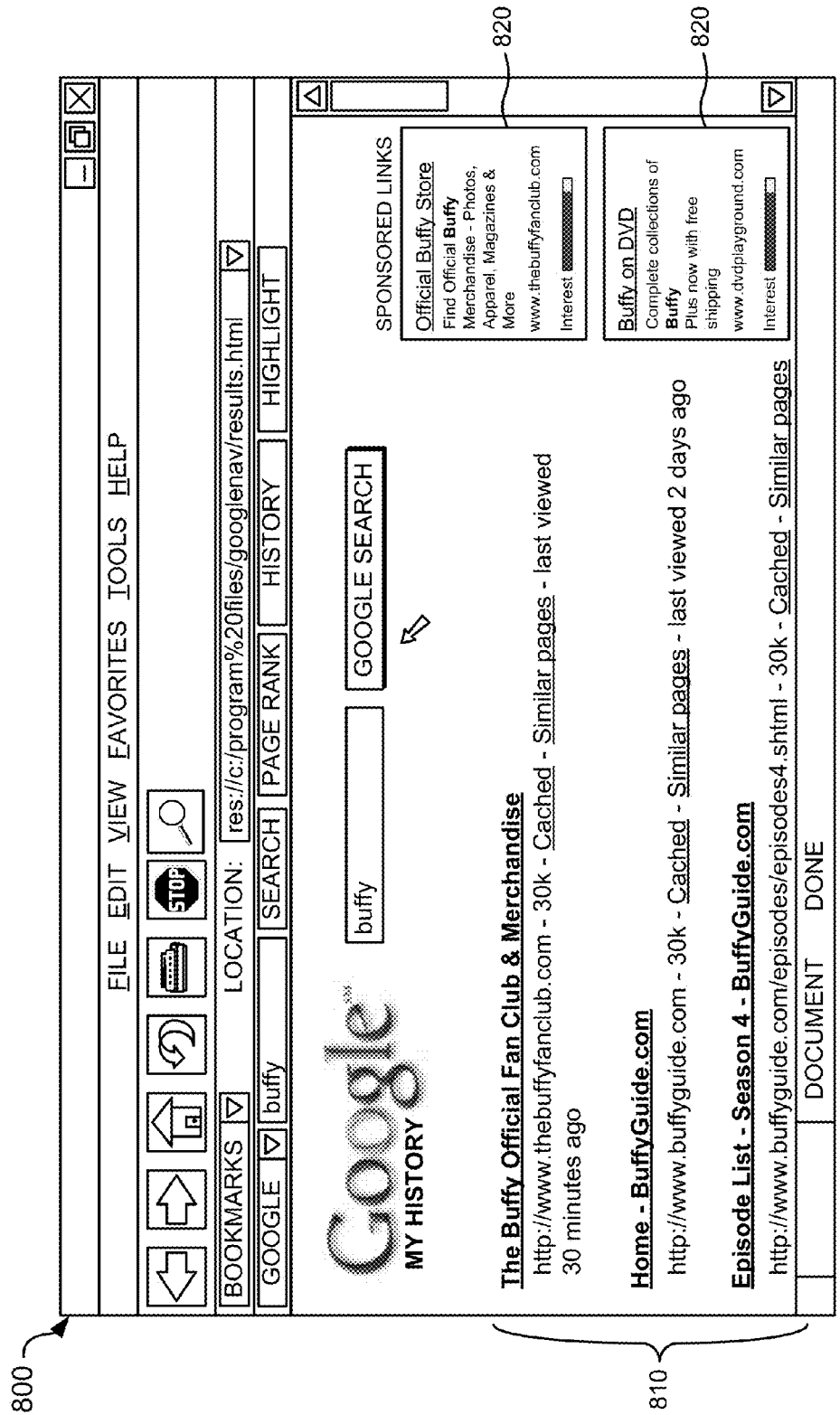
FIG. 8 is an exemplary diagram of a graphical user interface that presents results of an explicit search according to an implementation consistent with the principles of the invention.

FIG. 8 is an exemplary diagram of a graphical user interface 800 that presents results of an explicit search according to an implementation consistent with the principles of the invention. Assume, for this example, an explicit history search was performed based on the search term "buffy" received from a user.

Ranked results 810 may be presented to the user. Various information may be provided for each of the documents in the result list. For example, a document title (e.g., "The Buffy Official Fan Club & Merchandise"), a link to the document (e.g., http://www.thebuffyfanclub.com/index.cfm?promo=P261056), a size of the document (e.g., 30 k), a link to a cached version of the document (e.g., "Cached"), a link to similar documents (e.g., "Similar pages"), and information on when the document was last viewed (e.g., last viewed 30 minutes ago). Other information may alternatively or additionally be presented. One or more advertisements 820 may also be presented to the user. As illustrated, the advertisements 820 may be relevant to the initial search term (i.e., "buffy") entered by the user.

Exemplary Processing for Implicit History Search

Figure 9:
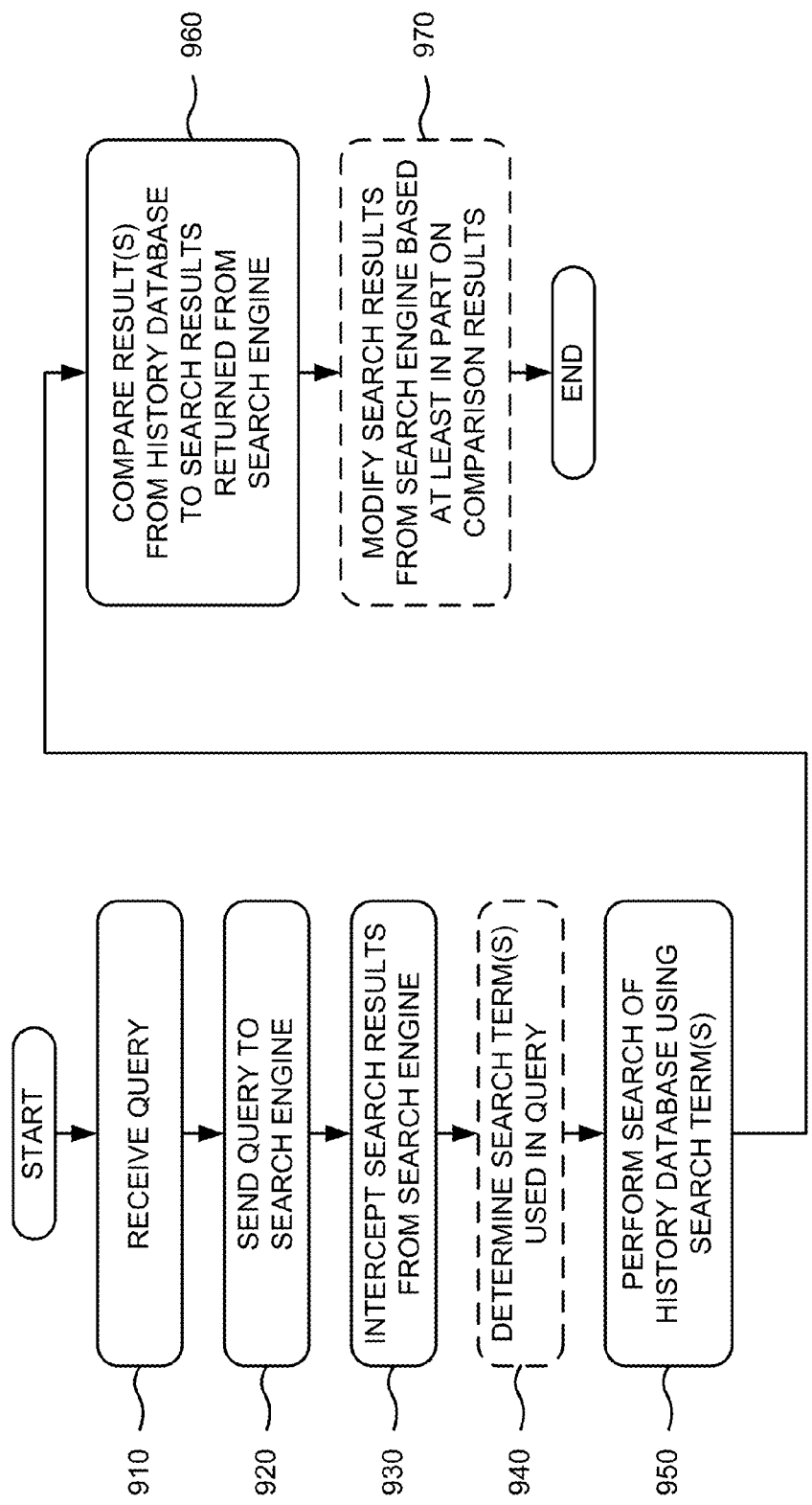
FIG. 9 is a flowchart of exemplary processing for performing an implicit history search according to an implementation consistent with the principles of the invention.

FIG. 9 is a flowchart of exemplary processing for performing an implicit history search according to an implementation consistent with the principles of the invention. Processing may begin with a user providing one or more search terms as a search query for searching a document corpus. In one implementation, the document corpus is the Internet and the vehicle for searching this corpus is a search engine, such as search engine 125 (FIG. 1). The user may provide the search query to search engine 125 via web browser software, such as browser 320 (FIG. 3), or browser assistant software, such as browser assistant 330, on a client, such as client 110 (FIG. 1).

Browser 320 (or browser assistant 320) may receive the search query and provide the query to search engine 125 (acts 910 and 920). Search engine 125 may act upon the query to generate data that contains the search results, which it returns to browser 320 (or browser assistant 330). Search engine 125 may provide the search results as a HyperText Markup Language (HTML) document, similar to search results provided by conventional search engines. Alternatively, search engine 125 may provide the search results according to a protocol agreed upon by search engine 125 and browser 320 (or browser assistant 330) (e.g., XML).

In an implementation consistent with the present invention, the search results include references to documents (e.g., web pages), such as links to the documents and possibly a textual description of the links. In another implementation, the search results include references to directory nodes within a hierarchical directory, such as links to the directory nodes and possibly textual descriptions for the directory nodes. In other implementations, the search results include a combination of these references or different types of references.

Browser assistant 330 may intercept the search results from search engine 125 (act 930). If the search results take the form of an HTML document, then browser assistant 330 may parse the document to determine the links that form the search results.

Browser assistant 330 may also determine the one or more search terms that were used to form the search query (act 940). Browser assistant 330 may determine the one or more search terms from information from search engine 125, such as the uniform resource locator (URL) returned by search engine 125 with the search results. In another implementation, the one or more search terms may be included in the search results returned by search engine 125. In this case, browser assistant 330 may extract the one or more search terms from the search results. If the search results take the form of an HTML document, then browser assistant 330 may parse the document to identify the one or more search terms. In yet another implementation, browser assistant 330 may record the one or more search terms when they are entered by the user.

Browser assistant 330 may use the one or more search terms to perform a search of history database 350 (act 950). For example, browser assistant 330 may send the one or more search terms as a search query to history database 350. History database 350 may use conventional database searching techniques to find matching documents (e.g., local and non-local documents) as results from the search. History database 350 may then return the results to browser assistant 330. The number of results returned by history database 350 may be predetermined, and possibly user-configurable.

In the case where history database 350 is implemented as multiple databases, browser assistant 330 may query each of them based on the search query. Browser assistant 330 may then merge their results.

In the case where history database 350 sets one or more thresholds for controlling which documents to include in the results, history database 350 may compare information regarding a document to these one or more thresholds to determine whether to permit the document to be included in the search results.

The results from history database 350 may be ranked in some manner. For example, the results may be ranked in a number of different ways and the particular way may be user-configurable. For example, the results may be ranked by date, relevancy, how much it is thought to be liked by the user, or some combination of these. It may be possible to obtain the assistance of a server, such as server 120, to aid in the ranking of the results.

When ranked by date, the results may be sorted based at least in part on when the documents were first or last accessed by the user. In other implementations, other dates relating to access of documents by the user may be used.

When ranked by relevancy, the results may be sorted based at least in part on how well the documents match the search term(s) provided by the user. In another implementation, the results may be sorted based at least in part on the PageRank™ associated with the documents. In yet another implementation, the results may be sorted by a server, such as server 120. In this case, the results may be transmitted to the server with a request to sort the documents. The server may sort the documents as if they were the result of a network search and return the sorted results for presentation to the user.

When ranked by how much it is thought to be liked by the user, the results may be sorted based on one or more factors that tend to indicate that the user likes certain documents more than other documents. For example, the rating of a document by the user (using, for example, voting buttons) may indicate whether the user likes the document. The frequency at which the user accesses a document may also indicate whether the user likes the document. It may be assumed that the user may tend to frequently visit documents that the user likes. The amount of time that the user spends accessing a document may further indicate whether the user likes the document. It may be assumed that the user may spend a lot of time accessing a document that the user likes. Combinations of these factors, or other factors, may be used to indicate whether a user likes a document.

Browser assistant 330 may compare the results from history database 350 ("history results") to the search results returned from search engine 125 (act 960). Browser assistant 330 may optionally modify the search results from search engine 125 (e.g., merge, add, delete, highlight, or reorder results), if necessary, based at least in part on the outcome of this comparison (act 970).

In particular, browser assistant 330 may determine whether the history results from history database 350 are included in the search results from search engine 125. If the history results are not included in the search results from search engine 125, browser assistant 330 may add these results to the search results from search engine 125. For example, browser assistant 330 may add the history results to a prominent place in the search results from search engine 125, such as adding them to the top of the search results possibly highlighted in some manner. This provides the user with information that may not be available via search engine 125, such as information that the user accessed locally (e.g., on client 110 or via a local network).

If the history results are included in the search results from search engine 125, browser assistant 330 may move them to a prominent place in the search results from search engine 125. In one implementation, browser assistant 330 may move these results to the top of the search results from search engine 125. In another implementation, browser assistant 330 may move these results up a predetermined, possibly user-configurable, number of positions in the search results from search engine 125. For example, each of the history results may be moved five positions toward the top of the search results. Browser assistant 330 may highlight the "moved" results in some manner. In another implementation, browser assistant 330 may highlight the results without moving the results.

Browser assistant 330 may modify the search results from search engine 125 in other ways. For example, browser assistant 330 may analyze the search results returned from search engine 125 to determine whether any these results is also included in history database 350. For any of the search results included in history database 350, browser assistant 330 may move their position (either up or down) within the search results by a predetermined amount. The predetermined amount may be user-configurable. For example, if the user has rated a document included in the search results (e.g., using voting buttons), browser assistant 330 may move the position of the document (either up or down) based on the user's rating. Alternatively, the predetermined amount may be fixed (e.g., five positions) or based on heuristics, such as one or more thresholds (e.g., move the position of the document in proportion to the number of times that the document is accessed, move the position of the document in proportion to the time the user spent accessing the document, etc.). Browser assistant 330 may highlight the "moved" results in some manner. Browser assistant 330 may also remove a document from the search results if the user has shown not to like it (e.g., if the user rated the document negatively, accessed the document only briefly, etc.).

The user may be permitted to turn on or turn off the modification of the search results from search engine 125. The user may also be permitted to determine how many positions one of the search results from search engine 125 may be moved (either up or down) prior to presenting the results to the user.

Instead of moving the search results a certain number of positions, browser assistant 330 may use a weighting scheme to specify how much weight the history results are given in the search results. Using the weighting scheme, browser assistant 330 may create a new score for the documents in the search results and rank the documents according to the new score. The new score might be calculated by:

new_score=search_engine_score+
history_weight*history_score.

Alternatively, the new score might be calculated by:

new_score=search_engine_score*(1+
history_weight*history_score).

In other implementations, the new score may be calculated in other ways.

It may be beneficial to place a threshold on a user's access of documents before reordering using it. The threshold may relate to an amount time that must pass between a user's access of a document and use of that document in results of an explicit or implicit search. Alternatively, the threshold may require that browser 330 be shut down prior between a user's access of a document and use of that document in results of an explicit or implicit search.

Figure 10:
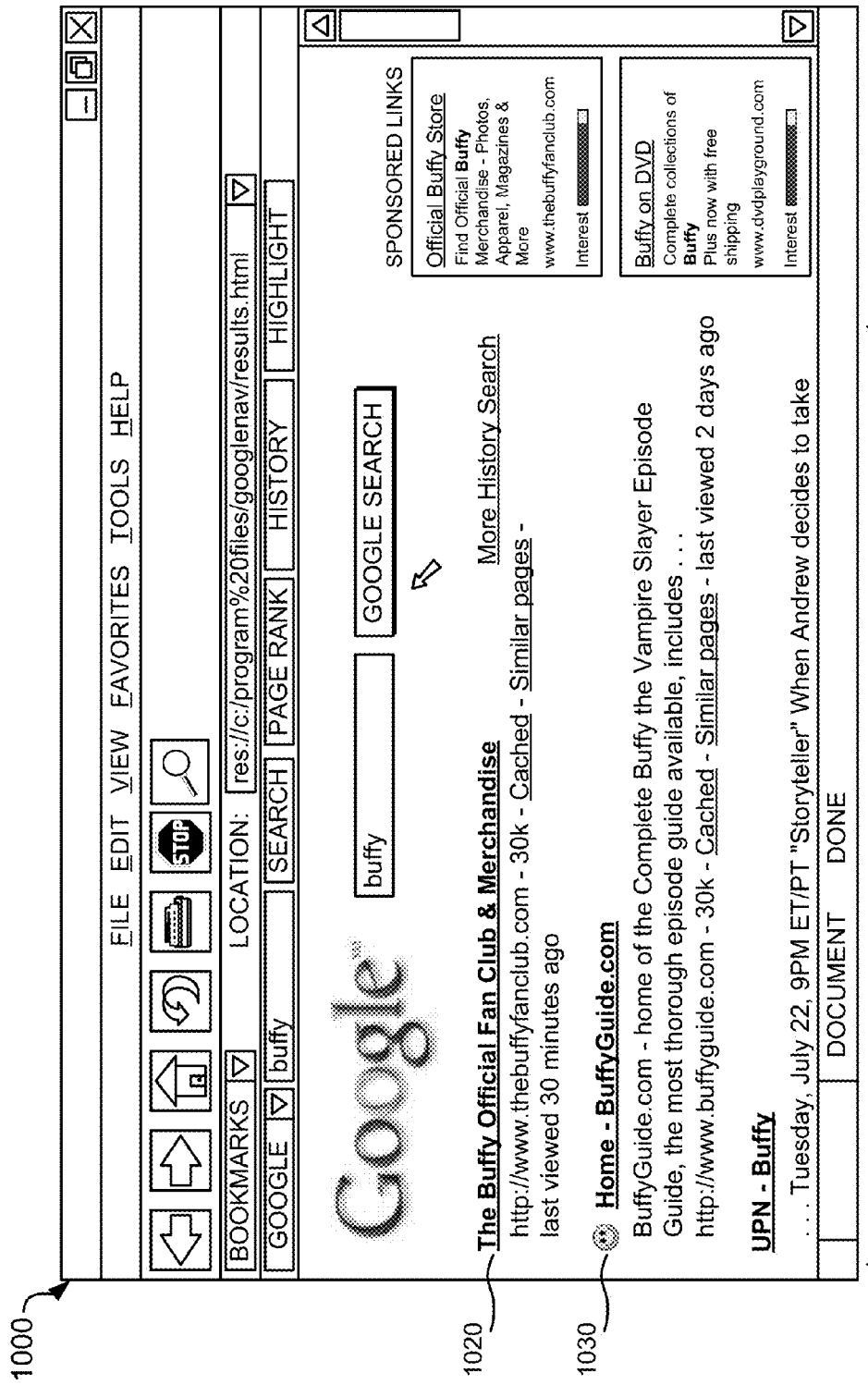
FIG. 10 is an exemplary diagram of a graphical user interface that presents results of an implicit search according to an implementation consistent with the principles of the invention.

FIG. 10 is an exemplary diagram of a graphical user interface 1000 that presents results of an implicit search according to an implementation consistent with the principles of the invention. Assume, for this example, a search was performed based on the search term "buffy" received from a user.

Search results 1010 may be presented to the user. Result 1020, corresponding to "The Buffy Official Fan Club & Merchandise," may include information obtained from history database 350. Result 1030, corresponding to "Home—BuffyGuide.com," may include a result that had its position moved upward in search results 1010. Result 1030 is highlighted by including a smiley face icon.

CONCLUSION

Systems and methods consistent with the principles of the invention index information corresponding to document accesses by a user. The systems and methods permit explicit and implicit searching of this information to present the information to a user in a manner that is meaningful to the user.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 6, 7, and 9, the order of the acts may be modified in other implementations consistent with the principles of the invention. Also, non-dependent acts may be performed in parallel.

Also, it has been described that the search results from search engine 125 may be modified to add, delete, merge, highlight, or reorder results. In another implementation consistent with the principles of the invention, the search results may not be modified. Instead, the history results from history database 350 may be presented to the user via a separate window or pop-up window, for example. In other words, the history results may be associated with the search results in other ways. For example, the history results may be included at the top, bottom, or side of the window including the search results, within a pop-up or drop-down window, or within a window separate from the window including the search results.

Further, it has been described that a user may specify certain parameters or functions with respect to an explicit or implicit search. These parameters and functions may be referred to as a user profile. In other implementations, multiple user profiles may be used.

What is claimed is:

1. A method performed by a client device, comprising:
   receiving, by the client device, a search query from a user;
   transmitting, by the client device, the search query to a server device;
   receiving, from the server device, a first set of search results, where each search result, in the first set of search results, has a respective first score;
   performing, by the client device, a search of a memory local to the client device to generate a second set of search results from a corpus of documents obtained prior to receiving the first set of search results, where each search result, in the second set of search results, has a respective second score;
   comparing, by the client device, the first set of search results and the second set of search results to identify a particular search result that is included in both the first set of search results and the second set of search results;
   generating, by the client device, a final score for the particular search result by combining the respective first score with a weighted, respective second score; and
   presenting, on a display associated with the client device, the first set of search results, where the particular search result is presented based on the final score.

2. The method of claim 1, where performing the search of the memory local to the client device to generate the second set of search results comprises:
   searching, by the client device, a history database that stores information regarding a plurality of documents that were accessed by the user prior to receiving the search query.

3. The method of claim 2, where the history database stores, for the plurality of documents, information regarding how the user interacted with a particular document of the plurality of documents.

4. The method of claim 3, where the information regarding how the user interacted with the particular document comprises:
   the number of times that the user has access the particular document,
   the dates when the user accessed the particular document,
   the amount of time that the user spent accessing the particular document, or
   whether the user saved a reference to the particular document.

5. The method of claim 3, where performing the search of the memory local to the client device to generate the second set of search results comprises:
   including the particular document in the second set of search results when the particular document was accessed by the user at least a threshold number of times.

6. The method of claim 3, where performing the search of the memory local to the client device to generate the second set of search results comprises:

including the particular document in the second set of search results when a threshold amount of time has passed between when the user last accessed the particular document and when the client device performed the search of the memory local to the client device to generate the second set of search results.

7. The method of claim 3, where performing the search of the memory local to the client device to generate the second set of search results comprises:
including the particular document in the second set of search results when the user has shut down a browser window used to access the particular document prior to when the client device performed the search of the memory local to the client device to generate the second set of search results.

8. The method of claim 2, where the history database stores, for the plurality of documents, information regarding how the user rated a particular document of the plurality of documents.

9. The method of claim 8, where performing the search of the memory local to the client device to generate the second set of search results comprises:
removing the particular document from the second set of search results when history database indicates that the user negatively rated the particular document.

10. The method of claim 1, further comprising:
ordering the first set of search results based on the respective first scores.

11. The method of claim 10, where presenting the first set of search results comprises:
reordering the particular search result within the first set of search results based on the final score for the particular search result.

12. The method of claim 1, further comprising:
permitting the user to stop the client device from generating the final score for the particular search result, and
presenting the first set of search results based on the respective first scores when the user stops the client device from generating the final score for the particular search result.

13. A device, comprising:
a memory to store instructions; and
a processor to execute the instructions to:
receive a search query from a user,
transmit the search query to a server device,
receive a first set of search results, where each search result, in the first set of search results, has a respective first score,
perform a search of a memory local to the device to identify a second set of search results from a corpus of documents obtained prior to receiving the first set of search results, where each search result, in the second set of search results, has a respective second score,
compare the first set of search results and the second set of search results to identify a particular search result that is included in both the first set of search results and the second set of search results,
generate a final score for the particular search result by combining the respective first score and a weighted, respective second score; and
present the first set of search results, where the particular search result is presented based on the final score.

14. The device of claim 13, where, when generating the final score for the particular search result by combining the respective first score and the weighted, respective second score, the processor is further generate the final score in accordance with the expression:

the final score=the respective first score+weight*the respective second score.

15. The device of claim 13, where, when generating the final score for the particular search result by combining the respective first score and the weighted, respective second score, the processor is further generate the final score in accordance with the expression:

the final score=the respective first score*(1+weight*the respective second score).

16. The device of claim 13, where the processor is further to:
permit the user to stop the device from generating the final score for the particular search result.

17. The device of claim 13, where the processor is further to:
add a particular search result from the identified second set of search results to the first set of search results when the comparison between the first set of search results and the second set of search results does not include the particular search result from the identified second set of search results.

18. The device of claim 17, where, when adding the particular search result from the identified second set of search results to the first set of search results, the processor is further to:
add the particular search result from the identified second set of search results to a prominent place in the first set of search results.

19. The device of claim 18, where the prominent place in the first set of search results is a beginning of the first set of search results.

20. The device of claim 13, where the processor is further to:
order the first set of search results based on the respective first scores.

21. The device of claim 20, where, when presenting the first set of search results, the processor is further to:
reorder the particular search result within the first set of search results based on the final score for the particular search result.

22. A non-transitory computer-readable storage medium that stores instructions executable by at least one processor for performing a method, the computer-readable medium comprising:
one or more instructions to receive a search query from a user;
one or more instructions to transmit the search query to a server device;
one or more instructions to receive a first set of search results, where each search result, in the first set of search results, has a respective rank;
one or more instructions to perform a search of a memory local to a client device to generate a second set of search results from a history database that stores information regarding a plurality of documents that were accessed by the user prior to receiving the first set of search results;
one or more instructions to compare the first set of search results and the second set of search results to identify a particular search result that is included in both the first set of search results and the second set of search results;
one or more instructions to modify the rank of the particular search result a predetermined number of positions toward a top of the first set of search results; and one or more instructions to present the first set of search results, where the position of the particular search result within the first set of search results is based on the modified rank of the particular search result.

23. The non-transitory computer-readable storage medium of claim 22, further comprising:
one or more instructions to parse the first set of search results to identify information contained in the first set of search results.

24. The non-transitory computer-readable storage medium of claim 22, where the one or more instructions to perform the search of the memory local to the client device to generate the second set of search results further comprises:
one or more instructions to identify one or more search terms used in the search query, and
one or more instructions to perform the search of the memory local to the client device, using the identified one or more search terms, to generate the second set of search results.

* * * * *